United States Patent [19]

Tsals

[11] Patent Number: 5,239,288
[45] Date of Patent: Aug. 24, 1993

[54] RESOLVER HAVING PLANAR WINDINGS

[75] Inventor: Izrail Tsals, Princeton, N.J.

[73] Assignee: Transicoil Inc., Worcester, Pa.

[21] Appl. No.: 491,187

[22] Filed: Mar. 9, 1990

[51] Int. Cl.⁵ .......................................... H01P 21/04
[52] U.S. Cl. .................................... 336/120; 336/123;
336/200; 336/225; 336/232
[58] Field of Search ................ 336/120, 121, 122, 123,
336/115, 180, 182, 200, 225, 232; 340/870.31

[56] References Cited

U.S. PATENT DOCUMENTS

| | | | |
|---|---|---|---|
| 1,639,044 | 8/1927 | Mansbridge | 336/123 |
| 2,900,612 | 8/1959 | Tripp | 336/123 |
| 3,098,990 | 7/1963 | Farrand et al. | 336/172 |
| 3,148,347 | 9/1964 | Morrison | 336/123 |
| 3,181,095 | 4/1965 | Farrand et al. | 336/30 |
| 3,198,923 | 8/1965 | Tripp | 200/167 |
| 3,198,932 | 8/1965 | Weatherly | 219/145 |
| 3,202,948 | 8/1965 | Farrand | 336/115 |
| 3,264,588 | 8/1966 | Winget | 336/30 |
| 3,312,892 | 4/1967 | Parnes | 323/93 |
| 3,356,932 | 12/1967 | Farrand | 323/51 |
| 3,441,888 | 4/1969 | Farrand | 336/123 |
| 3,609,320 | 9/1971 | Tripp | 235/151 |
| 3,668,587 | 6/1972 | Foster | 336/123 |
| 3,673,584 | 6/1972 | Farrand | 340/174 |
| 3,673,585 | 6/1972 | Tripp et al. | 340/198 |
| 3,757,321 | 9/1973 | Tripp | 340/347 |
| 3,772,587 | 11/1973 | Farrand et al. | 323/46 |
| 3,802,087 | 4/1974 | Raiteri | 33/178 |
| 3,848,157 | 11/1974 | Kripl | 317/5 |
| 3,858,109 | 12/1974 | Liden | 322/31 |
| 3,860,920 | 1/1975 | Tripp | 340/347 |
| 3,882,437 | 5/1975 | Geller | 336/123 |
| 3,887,857 | 6/1975 | Elbling | 318/572 |
| 3,961,318 | 6/1976 | Farrand et al. | 340/200 |
| 4,092,579 | 5/1978 | Weit | 318/662 |
| 4,138,253 | 2/1979 | Farrand | 96/27 |
| 4,199,800 | 4/1980 | Weit | 361/239 |
| 4,223,300 | 9/1980 | Wiklund | 336/121 X |
| 4,418,480 | 12/1983 | Garner | 33/349 |
| 4,463,333 | 7/1984 | Ruhle | 336/115 |

FOREIGN PATENT DOCUMENTS

| | | |
|---|---|---|
| 0133126A1 | 7/1984 | European Pat. Off. . |
| 133743 | 1/1979 | Fed. Rep. of Germany . |
| 2806660A1 | 8/1978 | Sweden . |

OTHER PUBLICATIONS

EP 91 81 0153 European Search Report (25 Sep. 1991).
Okuma Tekkosho K. K., Patent Abstract, vol. 8, No. 192 (P-298) (1629) 04 Sep. 1984.
Okuma Tekkosho K.K., JP-A-59 079808, Patent Abstract, 09, May 1984.
Shefrin YAA, Abstract No. A5993, vol. 6, Mar 3, 1982, Week E03, Soviet Inventions Illustrated, Derwent Publications Ltd., Section Electrical.
DEL Electronics Precision Angle Sensors Design and Engineering Manual.
Farand Inductosyn® Position Transducers for Commercial And Industrial Applications.

Primary Examiner—Thomas J. Kozma
Attorney, Agent, or Firm—Woodcock Washburn Kurtz Mackiewicz & Norris

[57] ABSTRACT

A printed circuit resolver produces voltage outputs that vary according to sine and cosine functions with the angular position of a rotor winding. Each resolver winding is planar and comprises at least two planar multi-turn coils formed on a disk. Each coil comprises N turns and 2 M sectors, where N and M are numbers.

18 Claims, 7 Drawing Sheets

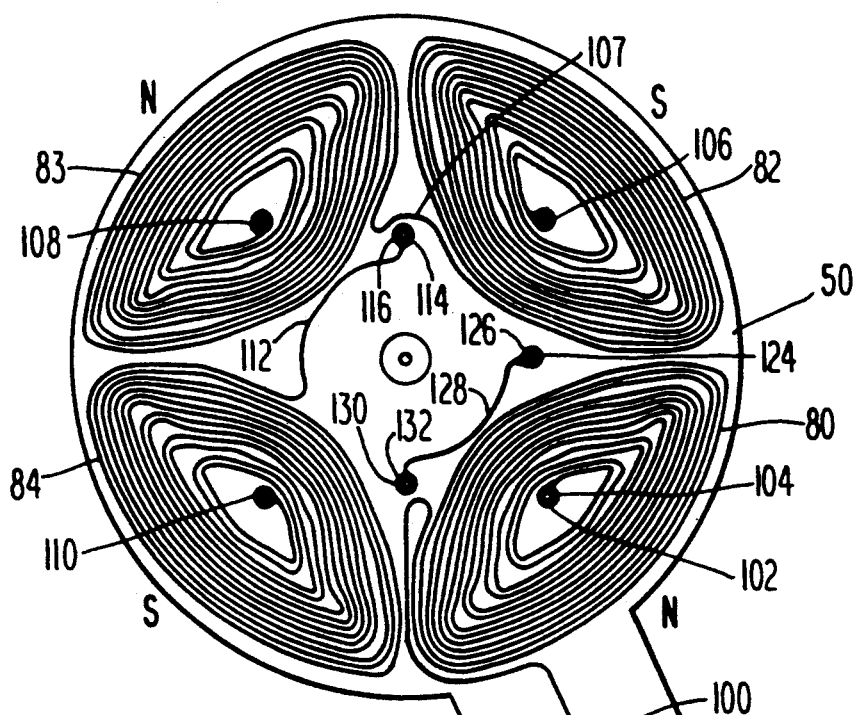
_Fig. 4_
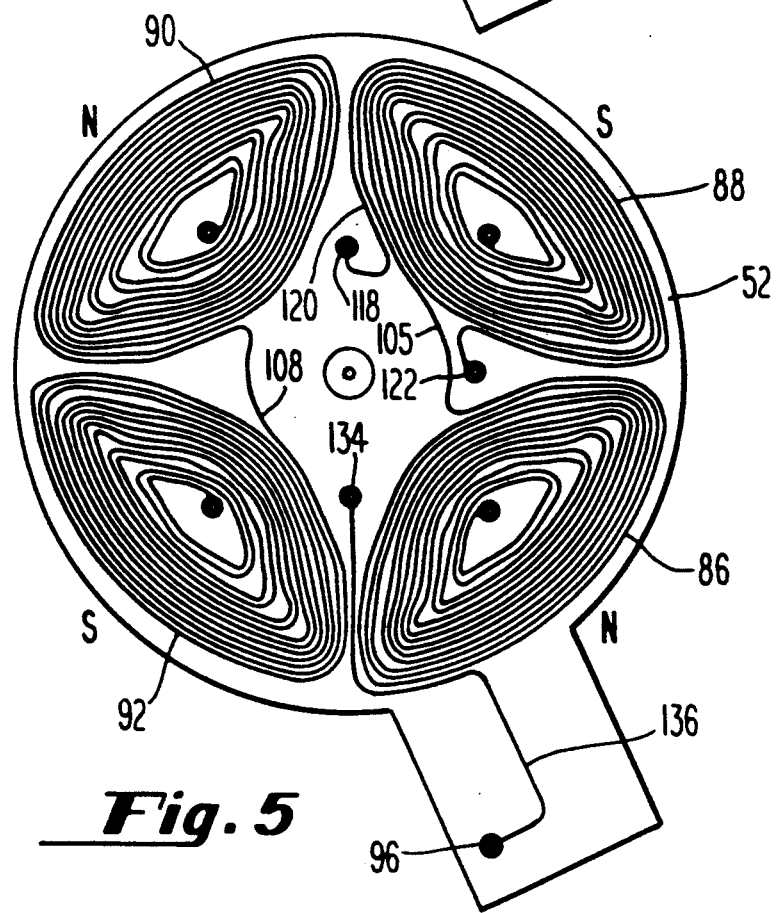
_Fig. 5_

RESOLVER HAVING PLANAR WINDINGS

The present invention generally relates to rotary position indicating transducers and, in particular, relates to a particular type of rotary position indicating transducer known as a resolver.

BACKGROUND OF THE INVENTION

A synchro is a rotary transducer that converts angular displacement into an AC voltage or an AC voltage into angular displacement. The common form of synchro is a relatively simple device having multi-turn 120° space-phased windings on its stator and a single multi-turn winding on its rotor. A typical, or two element, synchro system utilizes two such synchros with the stators of each being connected in parallel. In such a two element synchro system, an AC carrier or reference voltage, typically 60 or 400 Hz, is applied to the transmitter synchro or control transmitter rotor and the rotor position establishes a flux vector in the stator, generating particular voltages in each leg of the stator winding. These voltages are transmitted to the stator of the receiver synchro or control transformer where a similar vector flux pattern is reproduced. The rotor of the control transformer then aligns itself in the flux field.

A resolver is a type of synchro and is often called a "synchro resolver". A major difference between a synchro and a synchro resolver, or simply a resolver, is that the multi-turn stator and rotor windings of the resolver are displaced electrically 90° to each other instead of 120° as in the case of the synchro. The common form of resolver has a single rotor winding and two stator windings, each with many turns per pole. When the rotor of the resolver has an AC carrier voltage $V_{in}$ applied thereto, the voltage across one of the stators becomes: $V_1 = V_{in} K \sin \theta$, and the voltage across the other stator becomes: $V_2 = V_{in} K \cos \theta$, where K is a constant.

Thus, like a synchro, a resolver is a device that is used for the transmission, reception or conversion of angular data. A resolver is also a type of rotary position indicating transducer that produces two voltage outputs, one, $V_1$ varying as a sine function; and the other, $V_2$, varying as the cosine function, according to the angular position of a rotor with respect to a stator.

Another form of resolver has two stator and two rotor windings, each with many turns per pole, and the reference or carrier excitation voltage may be applied to any of the windings. If one of the stator windings are used as the input and excited, the unused stator winding is shorted. The voltages across the rotor windings are monitored as the output voltages and would be given as above for $V_1$ and $V_2$. Alternately, one of the rotor windings can be used as the input with the two stator windings being used as the outputs.

It may be explained here that synchro resolvers, or resolvers, are of two main types, brushless and non-brushless. A non-brushless resolver is one whose excitation winding is excited by means of a sliding contact with an AC source. A brushless resolver is a resolver in which the excitation winding is excited without the use of a sliding contact. One type of brushless resolver is a transformer brushless resolver. With a transformer brushless resolver, for example, the rotor winding is excited through an inductive coupling to an AC source.

Synchro resolvers or resolvers have traditionally been made with wound rotor and wound stator windings. Manufacture of such devices is labor intensive, and, therefore, expensive. Moreover, resolvers and, in particular brushless resolvers, are relatively heavy and have a large axial dimension. A need and demand has arisen for a resolver, and in particular for a transformer brushless resolver, that is inexpensive, light in weight and that has a relatively short axial dimension.

It would be desireable to provide a resolver that is inexpensive to manufacture, light in weight, and small in axial dimension. In order to achieve this objective, it would also be desireable to provide a resolver that employed printed, rather than wound, rotor and stator windings.

Various types of printed circuit rotary position indicating transducers are known, including both capacitive and inductive types. Though they perform some of the same functions as resolvers, neither type of device is, in fact, a resolver.

With capacitive type rotary position indicating transducers, a rotor having conducting capacitive plates affixed thereto, rotates with respect to a stator having associated conducting capacitive plates. The capacitance across the plates varies with their relative angular position. One disadvantage of capacitive rotary position indicating transducers resides in the fact that they are susceptible to shock and vibration. Shock and vibration may vary the dimensions of the air gap between the plates and, this, in turn, will vary the capacitance. A capacitive type rotary position indicating transducer is shown in U.S. Pat. No. 4,092,579-Weit. Though the transducer is referred to in the patent as a resolver, the device is not technically a type of resolver because it does not employ multi-turn windings.

Inductively coupled rotary position indicating transducers are also known. One such transducer is known as an Inductosyn position transducer and is described in a brochure entitled "Inductosyn Position Transducers" published by Farrand Industries, Inc. Such transducers employ printed circuit undulating conductive patterns, with a half turn per pole. The patterns have many hairpin turns that are situated along the flat surface of both a rotor disc and a stator disc. The length of one complete cycle of the hairpin pattern is called the pitch. One of the discs has a single winding pattern and the other has a first and a second winding pattern thereon with the second being displaced a predetermined distance from the first. Alternating current applied to the single winding on one disc as an excitation signal results in two output signals from the two windings on the second disc. The two output signals have amplitudes which vary as sine and cosine functions based on the relative position in the pitch cycle. There is a unique pair of sine and cosine output amplitudes for every position within one cycle of the pitch.

The Inductosyn, in actual operation, is similar to a resolver in that a sine and cosine function are derived. The device differs from a resolver, however, because it does not employ multi-turn windings. Because the Inductosyn does not employ multi-turn windings it suffers from several drawbacks. First, these devices are capable of directly sensing only very small angular displacements. If larger displacements are to be sensed, the devices must be used in conjunction with logic circuitry to unambiguously determine angular position greater than a few degrees of arc. Because of the need for such logic circuitry, the devices are expensive, costing as much as several thousand dollars per unit. Secondly, the transmission ratio, i.e., the output voltage divided by the input voltage, of such devices is very low. With typical wound rotor/wound stator resolvers the transmission ratio is much higher. Because of their low transmission ratio, the output voltage of such transducers must be amplified and the use of an amplifier contributes to the increased cost of such devices.

SUMMARY OF THE INVENTION

It is a primary object of the present invention to provide a resolver having planar windings, i.e., a printed circuit resolver, in response to, and in satisfaction of, the aforementioned need and demand experienced in actual practice.

It is another object of this invention to provide a planar winding having a unique coil geometry.

Another object of this invention is to provide a rotary position indicating transducer that is not sensitive to shock and vibration.

It is a further object of this invention to provide a resolver, and in particular a transformer brushless resolver, that is capable of inexpensive manufacture.

It is still another object of this invention to provide a resolver, and in particular a transformer brushless resolver, that has a high transmission ratio.

It is still a further object of this invention to provide a resolver, and in particular a transformer brushless resolver, that is relatively small in axial dimension and relatively light in weight.

It is still a further object of the present invention to provide a resolver, and in particular a transformer brushless resolver, that has clearly defined voltage outputs that vary according to a trigonometric function, i.e., sine and cosine functions, with the angular position of the rotor winding over an extensive arc with respect to the stator windings of the resolver.

The foregoing objects are achieved by a printed circuit resolver as compared to the wound rotor/stator winding resolvers of the prior art.

Briefly, and in accordance with the invention a resolver is provided having a stator assembly comprising a first planar, multi-turn stator winding and a second planar multi-turn stator winding. A rotor assembly is disposed adjacent to the stator assembly and is rotatable with respect to the stator assembly. The rotor assembly comprises a planar multi-turn rotor winding for inductively coupling its magnetic field to the stator windings when an energizing AC source is applied to the rotor winding. In this way a voltage is induced in each of the stator windings with each voltage varying according to a trigonometric function with the angular position of the rotor winding with respect to the stator windings.

In accordance with an important aspect of the present invention, resolver windings having a unique coil geometry are provided. Each resolver winding of the invention is planar and comprises at least two planar multi-turn coils formed on a disc. Each coil comprises N turns and 2M sectors, where N and M are numbers. In each sector, the radial and circumferential position of each point of a given turn with respect to the disc is defined along radial sector lines radiating from a center point of the disc. The position of each point of a given turn with respect to the center of the disc is defined by either an inner turn radii or an outer turn radii. The inner turn radii for any given turn is the distance from the center point of the disc to the most proximate point on that turn as measured along a given sector line. The outer turn radii for that turn is the distance from the center point of the disc to the most distant point on that turn as measured along the same sector line. The sum of all outer turn radii for a given sector line minus the sum of all inner turn radii for the given sector line defines a value. A set of all the values for all sector lines of the coil approximates a sinusoidal function.

The foregoing and other objects, features, and advantages of the invention will be apparent from the following more detailed description of the preferred embodiments of the invention, as illustrated in the accompanying drawings.

BRIEF DESCRIPTION OF THE DRAWINGS

FIGS. 4-9 illustrate the various layers of the stator assembly and show the various multi-turn conductive coils formed on each layer which, together, make-up the stator winding;

DESCRIPTION OF THE PREFERRED EMBODIMENTS

Figure 1:
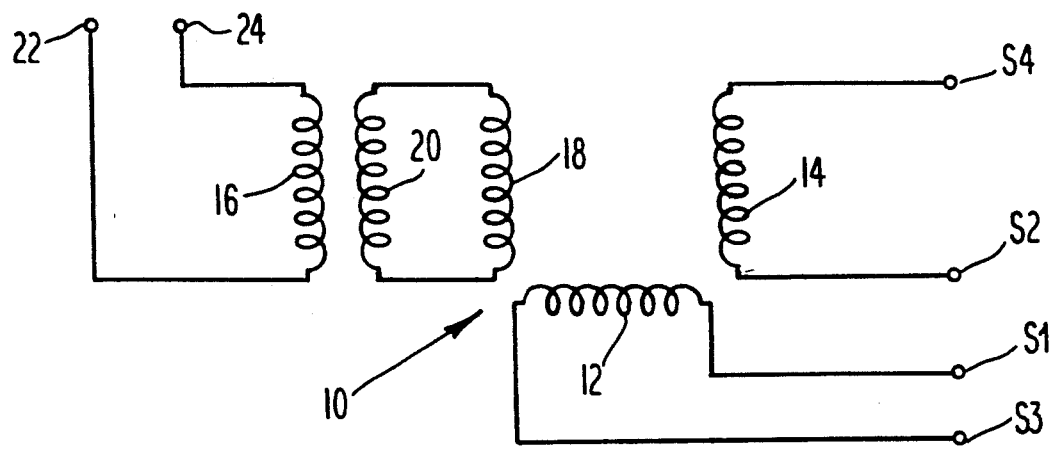
FIG. 1 depicts a schematic diagram of a transformer brushless resolver.

Referring now to the drawings and to FIG. 1 in particular there is shown generally at 10 a schematic diagram of a common form of a transformer brushless resolver. The resolver 10 includes a stator and a rotor. The stator includes a first multi-turn stator winding 12, a second multi-turn stator winding 14, and a multi-turn stator excitor winding 16. The rotor includes a multi-turn rotor winding 18 and a multi-turn rotor excitor winding 20 which is coupled or connected to the rotor winding 18. As depicted, the stator windings 12 and 14 of the resolver 10 are displaced electrically 90° to each other.

In operation, when the stator excitor winding 16 has an AC source applied to its terminals 22 and 24, an AC voltage is induced in the rotor exciter winding 20 and rotor winding 18. If the rotor is thus excited by an AC carrier voltage, $V \sin \omega_{ac} t$, the two stator output voltages between S1-S3 and S2-S4 become $$V_{s1\text{-}s3}(t) = KV \sin \theta \sin \omega_{ac} t$$

$$V_{s2\text{-}s4}(t) = KV \cos \theta \sin \omega_{ac} t$$

where $\theta$ is the resolver shaft angle, $V$ and $\omega_{ac}$ are, respectively, the amplitude and radian frequency of the reference (or "carrier") AC voltage, i.e., the voltage induced in the rotor winding and K is the transformation coefficient.

It will be understood from the foregoing that the resolver depicted in FIG. 1 is a position indicating transducer that produces two voltage outputs across S1-S3 and across S2-S4 respectively, one varying as a sine function and the other varying as the cosine function, according to the angular position of the rotor with respect to the stator. The present invention is directed to a resolver of the general type shown in FIG. 1 but which does not include wound coils, which has a high transmission ratio and which has a small axial dimension.

Figure 2:
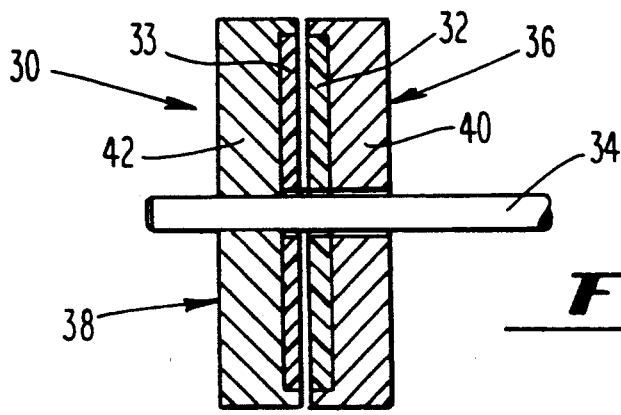
FIG. 2 is a diagrammatic cross sectional view of a resolver in accordance with the invention.

Referring now to FIG. 2 there is shown a cross sectional view of a brushless resolver 30 in accordance with the present invention. The resolver 30 includes a central shaft 34. The resolver 30 further includes a stator assembly 36 and a rotor assembly 38. The stator assembly 36 is fixed whereas the rotor assembly 38 rotates, along with the shaft 34, with respect to the stator assembly.

The stator assembly 36 includes a first planar ferromagnetic plate 40 and a multi-layer disc 32. The rotor assembly 38 includes a second planar ferromagnetic plate 42 and a multi-layer disc 33. The ferromagnetic plates 40, 42 provide paths of low magnetic reluctance. The multi-layer discs 32 and 33 include insulating layers upon which multi-turn windings are formed as will be more fully described below. The resolver 30 of the present invention employs no wound coils. Moreover, the combined axial dimension of the rotor and stator assemblies is on the order of 0.25 inch. The resolver has a transmission ratio on the order of approximately 1.0 +/− 5%. The resolver provides a position signal accurate to within +/− 60 minutes of arc over 360 degrees.

In operation, the resolver 30 generates two different voltage output signals which vary according to a trigonometric function in accordance with the angular position of the rotor with respect to the stator, as described above with reference to FIG. 1. One of the voltage output signals varies in a sine function and the other varies in a cosine function in accordance with the angular position of the central shaft 34 with respect to the stator assembly 36.

Figure 3:
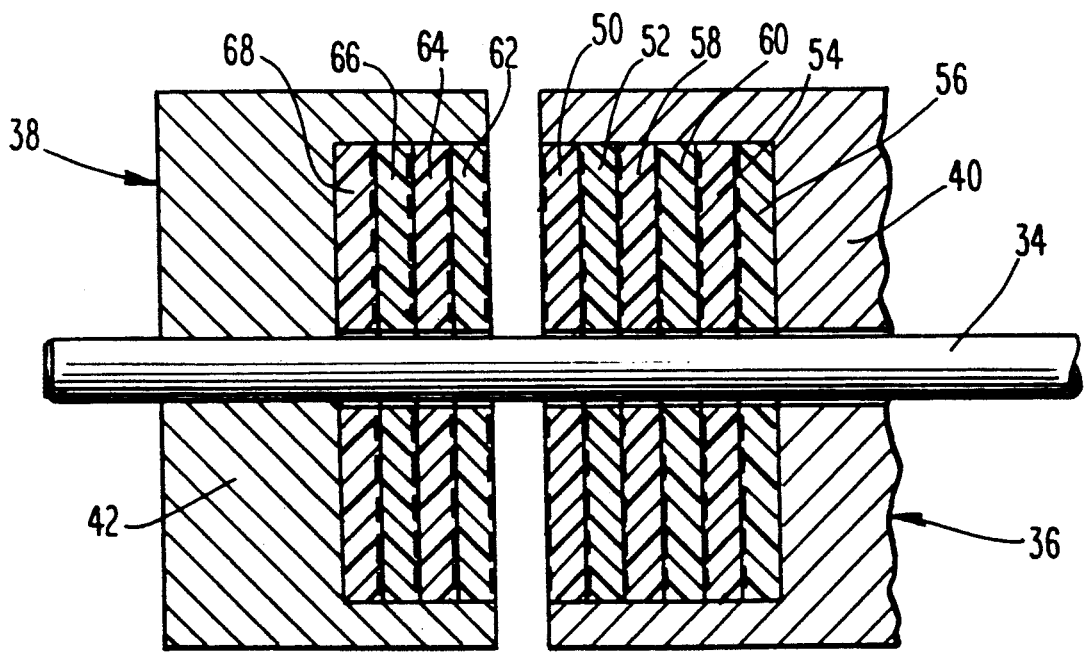
FIG. 3 is a partial exploded view of the rotor and stator assemblies of FIG. 2 illustrating the various layers of these assemblies.

Referring now to FIG. 3, the construction of the stator and rotor assemblies, 36 and 38 respectively, will be described. FIG. 3 is a partial exploded view of the rotor and stator assemblies of FIG. 2. As can be seen in FIG. 3, and as will become even more evident in the description of FIGS. 4–9, the stator assembly 36 comprises a multi-layer disc 32 having first, second, third, fourth, fifth and sixth planar insulating layers 50, 52, 54, 56, 58 and 60, respectively upon which conductive patterns are formed. The multi-layer disc 32 of the stator assembly 36 is seated in a recess formed in the ferromagnetic plate 40.

As can also be seen in FIG. 3, and as will become even more evident in the description of FIGS. 10–13, the rotor assembly 38 also comprises a multi-layer disc 33 having first, second, third and fourth planar insulating layers 62, 64, 66 and 68 respectively upon which conductive patterns are formed. The multi-layer disc 33 of the rotor assembly 38 is seated in a recess formed in the ferromagnetic plate 42.

Referring now more particularly to FIGS. 4–9 the stator assembly 36 will be described in further detail. In FIG. 4, the first planar insulating layer 50 is shown. The planar insulating layer 50 has a four multi-turn conductive patterns 80, 82, 83 and 84 formed on the surface thereof. In FIG. 5, the adjacent planar insulating layer 52 is shown. Insulating layer 52 also includes four multi-turn conductive patterns 86, 88, 90 and 92 formed on the surface thereof. As can be seen from FIGS. 3, 4 and 5, the first and second insulating layers 50, 52, respectively, lie in parallel planes. The multi-turn conductive patterns formed on the layers 50, 52 are interconnected by through-hole connections such that the patterns together form the first stator winding equivalent to the stator winding 14 shown in FIG. 1. The first portion of the first stator winding is carried by the insulating layer 50 and comprises a first plurality of printed circuit multi-turn stator coils 80, 82, 83 and 84 disposed in spaced apart relationship on the first insulating layer 50. The second portion of the first stator winding is carried by the insulating layer 52 and comprises a second plurality of printed circuit multi-turn stator coils 86, 88, 90 and 92 disposed in spaced apart relationship on the second insulating layer 52. The two output terminals for the first stator winding are shown at 94 on insulating layer 50 and at 96 on insulating layer member 52. When the layers 50 and 52 are assembled, the coils 80 (on layer 50) and 86 (on layer 52) are adjacent or opposed and in registry with one another. The same is true for the coils 82, 88; 83, 90; and 84, 92. As will be explained hereinafter the layers 50, 52, together with the coils disposed thereon, comprise a two layer four pole printed circuit winding assembly.

The first stator winding forms a continuous electrical path from the output terminal 94 on layer 50 to the output terminal 96 on layer 52. The printed circuit conductor 100 extends from the terminal 94 to the first multi-turn printed circuit coil 80. The coil 80 is wound in a first or counterclockwise direction and ends on first layer 50 at node 102. The second layer 52, immediately adjacent to layer 50, is positioned such that its first coil 86 is positioned adjacent to the first coil 80 of first layer 50. The first coil 80 on first layer 50 is connected, through a so-called via hole 104 in the first layer 50, in series with the first coil 86 of the second layer 52. The first coil 86 of the second layer 52 is wound in the same direction, i.e., counterclockwise, as the first coil 80 of first layer 50 and it is connected in series by way of printed circuit conductor 105 with the second coil 88 of the second layer 52. The second coil 88 of the second layer 52 is wound in the opposite direction, i.e., clockwise, of the first coil 86 of the second layer 52. The second coil 88 of the second layer 52 is connected through via hole 106 in layer 50 in series with the second coil 82 of first layer 50. The second coil 82 of the first layer is wound in the same direction, i.e., clockwise, as the second coil 88 of the second layer 52 and it is connected in series by way of printed circuit conductor 107 with the third coil 83 on first layer 50. The third coil 83 of the first layer 50 is wound in the opposite direction, i.e., counterclockwise, of the second coil 82 of the first layer 50. The third coil 83 of the first layer 50 is connected through via hole 108 in layer 50 in series with the third coil 90 of the second layer 52. The third coil 90 of the second layer 52 is wound in the same direction as the third coil 83 of the first layer 50 and it is connected in series by way of printed circuit conductor 108 with the fourth coil 92 on the second layer 52. The fourth coil 92 of the second layer 52 is wound in the opposite direction, i.e., clockwise, of the third coil 90 of the second layer 52. The fourth coil 92 of the second layer 52 is connected through via hole 110 in layer 50 to the fourth coil 84 of the first layer 50. The fourth coil 84 of layer 50 is wound in the same direction, i.e., clockwise as the fourth coil 92 of the second layer 52. The printed circuit conductor 112 connects coil 84 to node 114 which, in turn, is connected through via hole 116 to node 118 on layer 52. Printed circuit conductor 120 wraps around coil 88 and is connected to node 122 which, in turn, is connected through via hole 124 to node 126 on layer 50. Printed circuit conductor 128 interconnects node 126 to node 130 which, in turn, is connected through via hole 132 to node 134 on layer 52. The node 134, by way of printed circuit conductor 136, is connected to output terminal 96.

From the foregoing it will be understood that the coils on the adjacent pair of insulating layers 50, 52 are opposed and in substantial registry with each other and that opposed and registered coils comprise a plurality of pairs of opposed and registered coils, i.e., coils 80 and 86 form a pair of opposed and registered coils as do coils 82 and 88; 83 and 90; and, 84 and 92. The coils in each pair of opposed and registered coils are connected in series and wound in the same direction. Adjacent pairs of opposed and registered coils are connected in series with each other and wound in opposite directions. Because of this coil geometry flux cancellation is achieved in the interconnecting conductors in layer 50 and layer 52. It will be further understood that when current flows in the coils of the stator winding disposed on layers 50 and 52 that a multi-turn four pole winding is established with adjacent pairs, e.g., 80, 86 and 82, 88, forming opposite poles. This is depicted in FIGS. 8 and 9 by the designations N, S, N, S.

Figure 8:
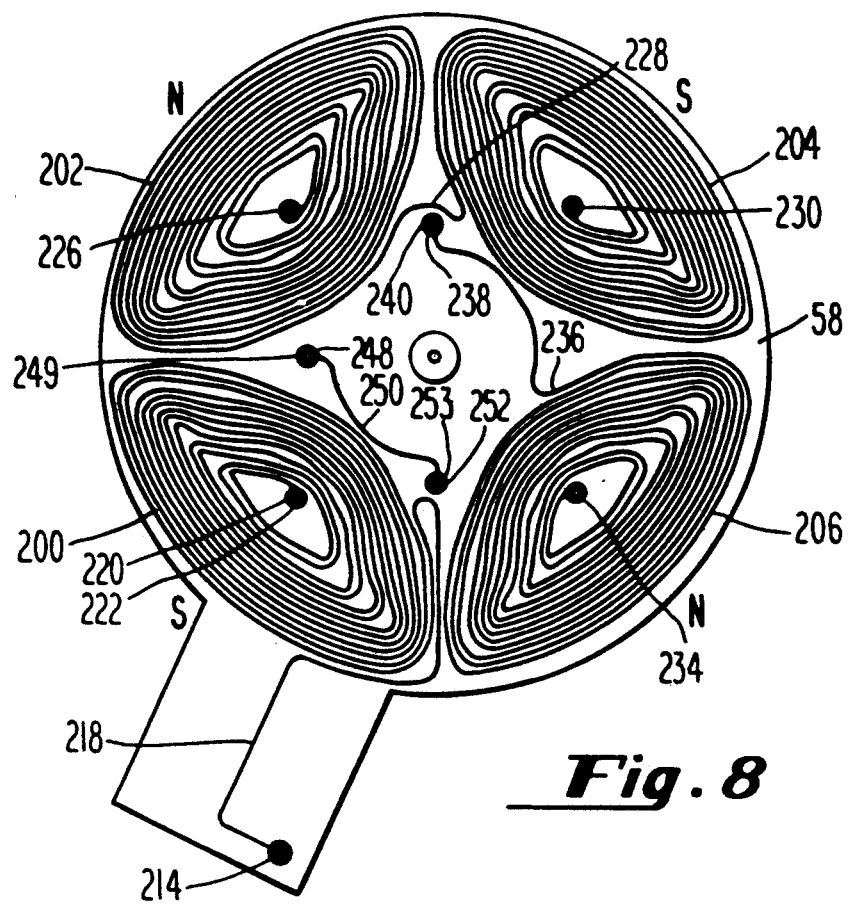
Figure 9:
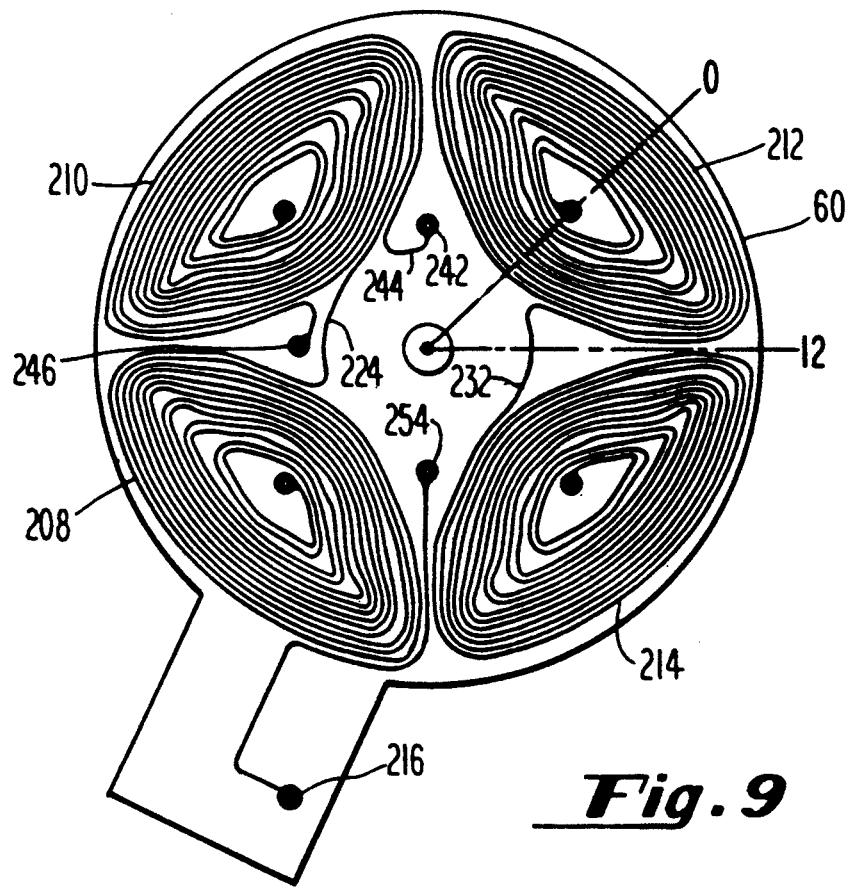

Referring now to FIGS. 8 and 9, a second stator winding of the resolver according to the invention will now be described. The insulating layers 58 and 60 each support a portion of the second stator winding which portions together would be the equivalent of the stator winding 12 shown in FIG. 1. The first portion of the second stator winding is carried by the third insulating 58 and comprises a third plurality of printed circuit multi-turn stator coils 200, 202, 204 and 206 disposed in spaced apart relationship. The second portion of the second stator winding is carried by the fourth insulating 60 and comprises a fourth plurality of printed circuit multi-turn stator coils 208, 210, 212, and 214 disposed in spaced apart relationship. The two output terminals for the second stator winding are shown in 214 on insulating layer 58 and at 216 on insulating layer 60.

Like the first stator winding, the second stator winding forms a continuous electrical path from the output terminal 214 on layer 58 to the output terminal 216 on layer 60. The printed circuit conductor 218 extends from the terminal 214 to the first multi-turn printed circuit coil 200 on layer 58. The coil 200 is wound in a first direction, i.e., clockwise, and ends on third layer 58 at node 220. The fourth layer 60, immediately adjacent to layer 58, in positioned such that its first coil 208 is positioned adjacent to the first coil 200 of third layer 58. The first coil 200 on third layer 58 is connected, through via hole 222 in the third layer 58, in series with the first coil 208 of the fourth layer 60. The first coil 208 of the fourth layer 60 is wound in the same direction, i.e., clockwise, as the first coil 200 of third layer 58 and it is connected in series by way of printed circuit conductor 22 with the second coil 210 of the fourth layer 60. The second coil 210 of the fourth layer 60 is wound in the opposite direction, i.e., counterclockwise, of the first coil 208 of the fourth layer 60. The second coil 210 of the fourth layer 60 is connected through via hole 226 in layer 58 in series with the second coil 202 of the third layer 58. The second coil of the third layer 58 is wound in the same direction, i.e., counterclockwise, as the second coil 210 of the fourth layer 60 and it is connected in series by wa of printed circuit conductor 228 with the third coil 204 on the third layer 58. The third coil 204 of the third layer 58 is wound in the opposite direction, i.e, clockwise, of the second coil 202 of the third layer. The third coil 204 of the third layer 58 is connected through via hole 230 in layer 58 in series with the third coil 212 of the fourth layer 60. The third coil 212 of the fourth layer 60 is wound in the same direction as the third coils 204 of the third layer 58 and it is connected in series by way of printed circuit conductor 232 with the fourth coil 214 on the fourth layer 60. The fourth coil 214 of the fourth layer 60 is wound in the opposite direction, i.e., counterclockwise, of the third coil 212 of the fourth layer. The fourth coil 214 of the fourth layer is connected through via hole 234 in layer 58 to the fourth coil 206 of the third layer 58. The fourth coil 206 of layer 58 is wound in the same direction, i.e., counterclockwise, as the fourth coil 214 of the fourth layer 60. The printed circuit conductor 236 connects coil 206 to the node 238 which, in turn, is connected through via hole 240 to node 242 on fourth layer 60. Printed circuit conductor 244 wraps around coil 210 on layer 60 and is connected to node 246 which, in turn, is connected through via hole 248 to node 249 on third layer 58. Printed circuit conductor 250 interconnects node 249 to node 252 which, in turn, is connected through via hole 253 to node 254 on fourth layer 254. The node 254, by way of printed circuit conductor 256, is connected to output terminal 216.

Figure 6:
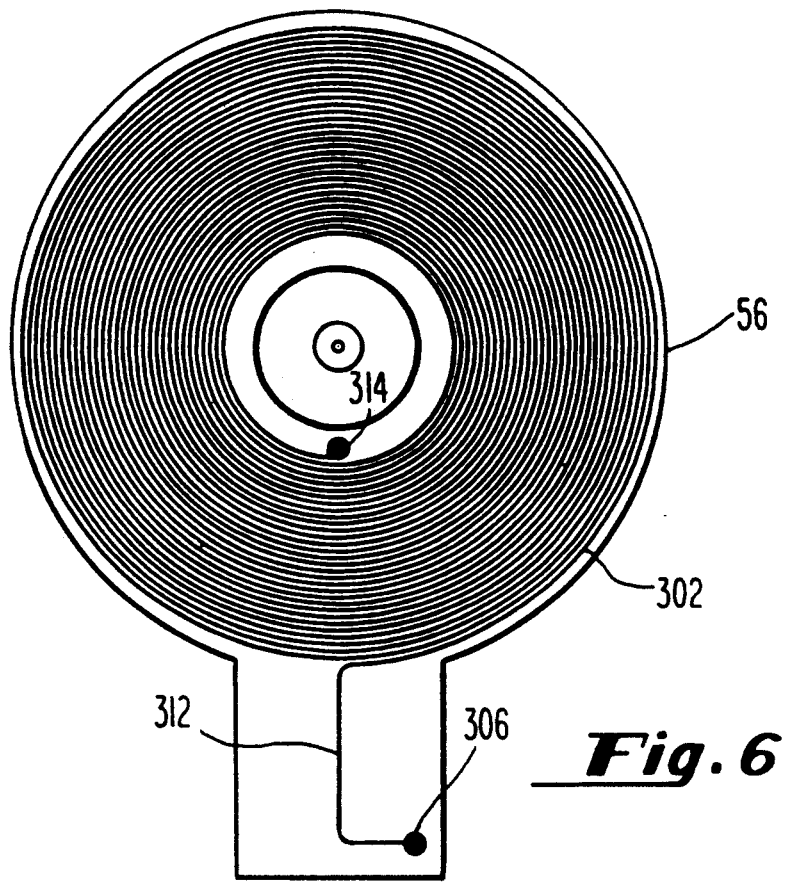
Figure 7:
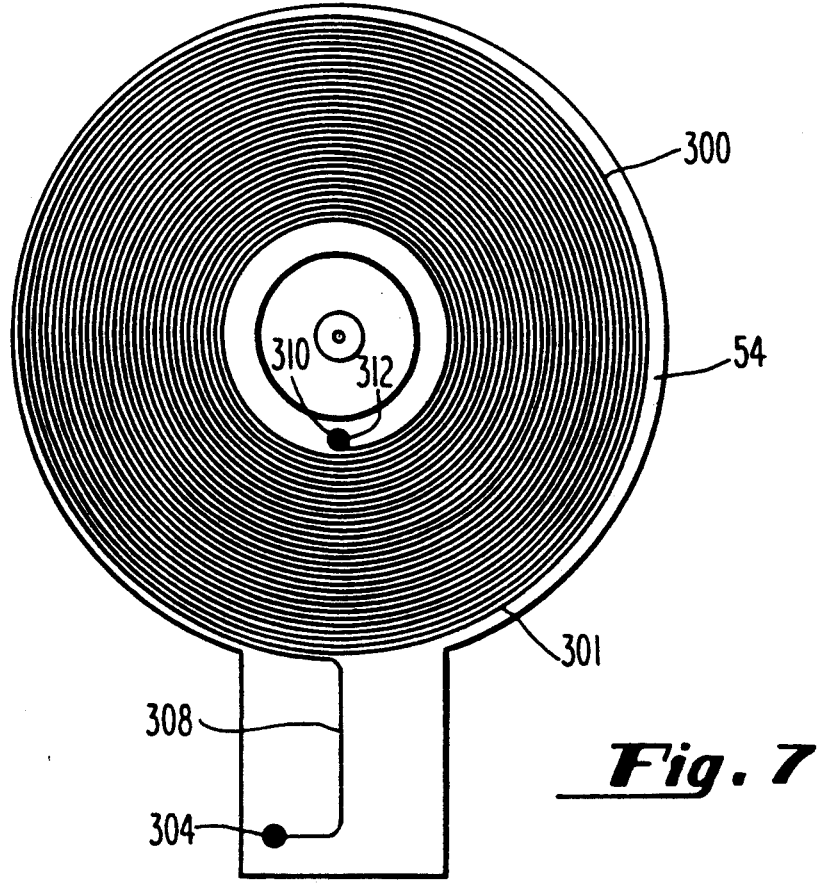

To complete the description of the stator assembly 36, reference is now made to FIGS. 6 and 7 which illustrate the planar stator excitor winding in accordance with the invention. The stator excitor winding is comprised of a first portion 300 (See FIG. 7) and a second portion 302 (See FIG. 6). The first portion 300 of the stator excitor winding comprises a single printed circuit multi-turn coil 301 disposed on the fifth insulating layer 54 and the second portion 302 comprises a single printed circuit multi-turn coil 303 disposed on the sixth insulating layer 56. The stator excitor winding forms a continuous electrical path from the input terminal 304 on layer 54 to the output terminal 306 on layer 56. The printed circuit conductor 308 extends from the terminal 304 to the beginning of the coil 301 on layer 54 with coil 301 being wound in a clockwise direction and ends on the fifth layer 54 at node 310. The first portion of the stator excitor coil 301 is connected, through via hole 312 in the fifth layer 54, and node 314 on layer 56, in series with the second portion 302 of stator excitor winding on layer 56. The second portion 302 is wound in the same direction as the coil 301 on fifth layer 54. The end of the second portion 302 of stator excitor winding disposed on fifth layer 54 is connected via printed circuit conductor 312 to input terminal 306. The portions 301 and 302 of the stator excitor winding together would be the equivalent of the stator excitor winding 16 shown in FIG. 1. Because the windings on layers 54 and 56 are in registry with one another but further in view of the fact that current flows in opposite directions on each layer, any flux generated between layers 54 and 56 is cancelled.

Figure 10:
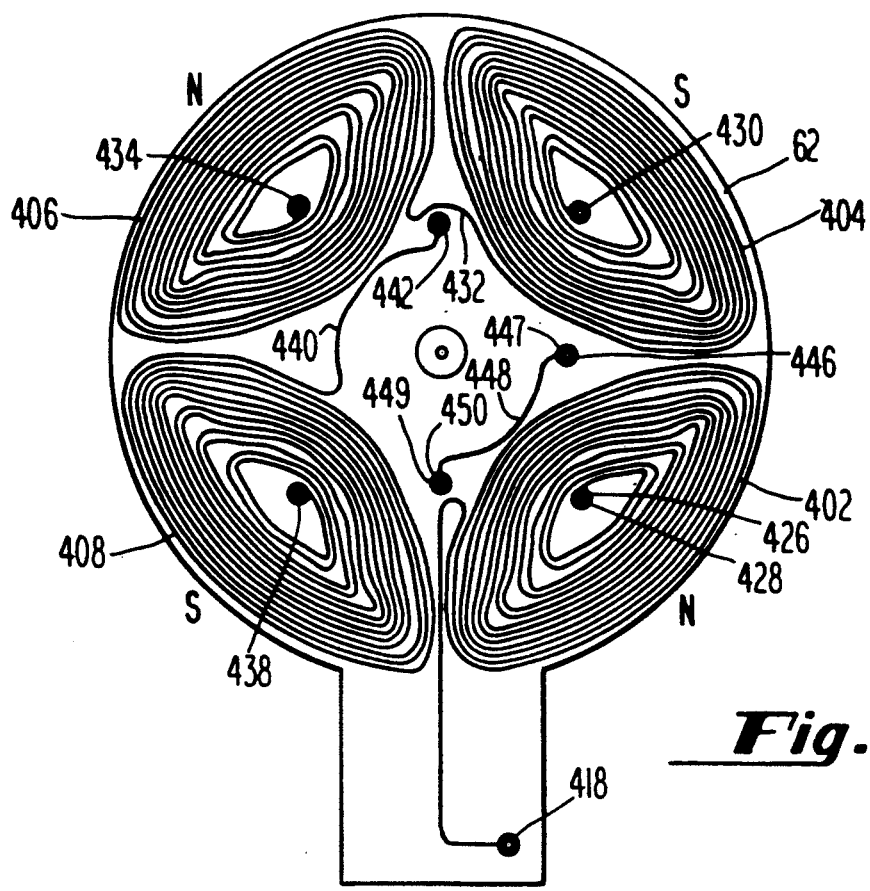
FIGS. 10-13 illustrate the various insulating layers of the rotor assembly and show the multi-turn conductive coils formed on each layer which, together, make-up the rotor winding.

Turning now to FIGS. 3 and 10-13, the rotor assembly 38 will now be described. In FIG. 10, the first planar insulating layer 62 of the rotor is shown and, in FIG. 11, the adjacent planar insulating layer 64 is shown, As can be seen from FIGS. 3, 10 and 11, the first and second insulating layers 62 and 64 respectively, lie in parallel planes. The insulating layers 62, 64 each support a portion of the rotor winding which portions together are equivalent of the rotor winding 18 shown in FIG. 1.

The first portion of the rotor winding is carried by the insulating layer 62 and comprises a first plurality of printed circuit multi-turn rotor coils 402, 404, 406 and 408 disposed in spaced apart relationship thereon. The second portion of the rotor winding is carried by the insulating layer 64 (FIG. 11) and comprises a second plurality of printed circuit multi-turn rotor coils 410, 412, 414 and 416 disposed in spaced apart relationship thereon. The two terminals of the rotor winding are shown at 418 on support means 62 and at 420 on insulating layer 64.

Figure 11:
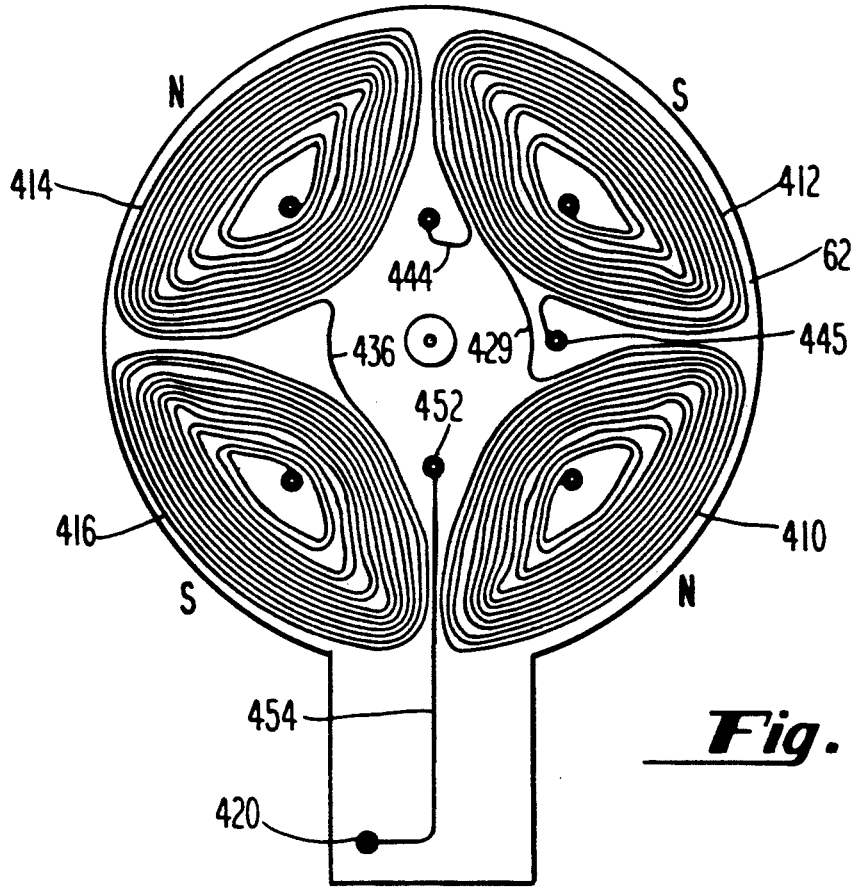

The rotor winding forms a continuous electrical path from the terminal 418 on insulating layer 62 to the terminal 420 on insulating layer 64. The printed circuit conductor 425 extends from the terminal 418 to the first coil 402. The coil 402 is wound in a first or counterclockwise direction and extends to node 426. The second support means or layer 64, immediately adjacent to insulating layer 62, is positioned such that its first coil 410 is positioned adjacent to the first coils 402 of the first layer 62. The first coil 402 is connected through via hole 428 in the first layer 62, in series with the first coil 410 of the second layer 64. The first coil 410 of the second layer 64 is wound in the same counterclockwise direction as the first coil 402 of layer 62 and is connected in series by way of the printed circuit conductor 429 with the second coil 412 of the second layer 64. The second coil 412 of the second layer 64 is wound in the opposite direction, i.e., clockwise, of the first coil 410. The second coil 412 is connected through via hole 430 in layer 62 in series with the second coils 404 of the first layer 62. The second coil 404 is wound in the same direction, i.e., clockwise, as the second coil 412 of layer 64 and is connected in series by way of printed circuit conductor 432 with the third coil 406 on the first layer 62. The third coil 406 is wound in the opposite direction, i.e., counterclockwise, of the second coil 404. The third coil 406 is connected through via hole 434 in layer 62 in series with the third coil 414 of the layer 64. The third coil 414 is wound in the same direction as the third coil 406 of layer 62 and it is connected in series by way of printed circuit conductor 436 with the fourth coil 416 on the layer 64. The fourth coil 416 is wound in the opposite direction, i.e., clockwise, of the third coil 414 of layer 64. The fourth coil 416 of the layer 64 is connected through via hole 438 in layer 62 to the fourth coil 408 of first layer 62. The fourth coil 408 is wound in the same direction, i.e., clockwise as the forth coil 416 of the layer 64. The printed circuit conductor 440 connects coil 408 to node 442 which, in turn, is connected through via hole 442 to node 443 on layer 64. Printed circuit conductor 444 wraps around coil 412 and is connected to the node 445 which, in turn, is connected through via hole 446 to node 447 on layer 62. Printed circuit conductor 448 interconnects node 447 to node 449 which, in turn, is connected through via hole 450 to node 452 on layer 62. The node 452, by way of printed circuit conductor 454, is connected to terminal 420. It will be understood from the foregoing that when current flows in the coils of the rotor winding disposed on layers 62 and 64 that a multi-turn, four pole winding is established with adjacent pairs, e.g. 402, 410 and 404, 412, forming opposite poles. This is depicted in FIGS. 10 and 11 by the designations N, S, N, S.

Figure 12:
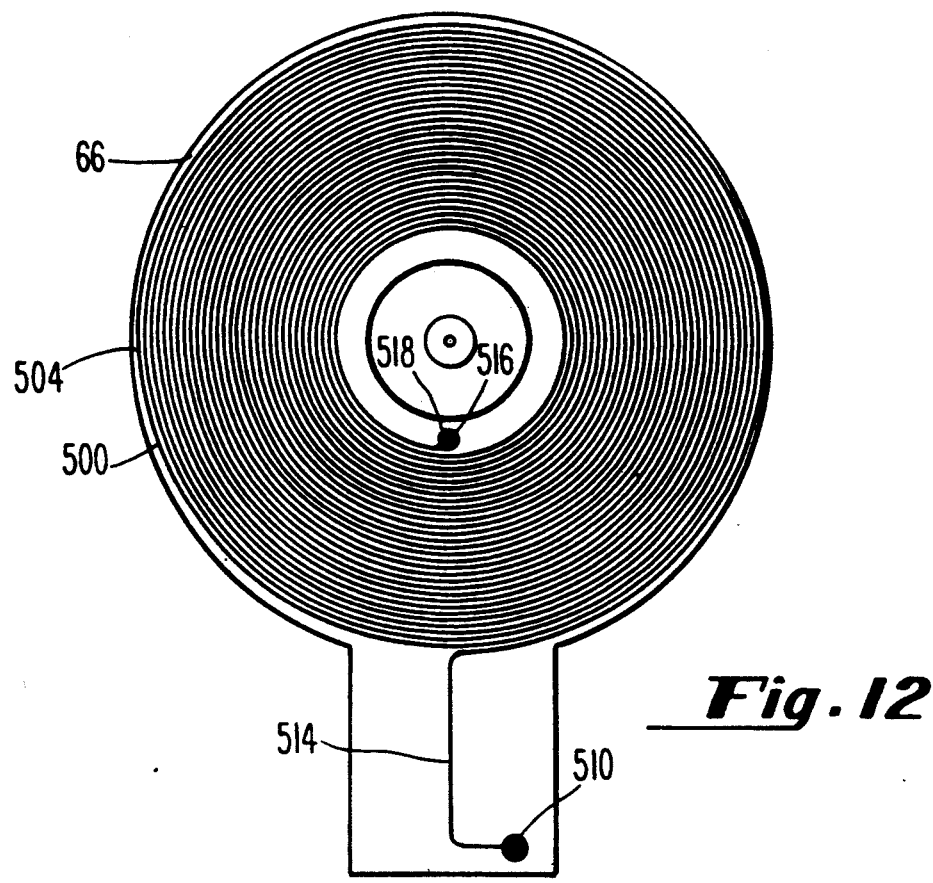
Figure 13:
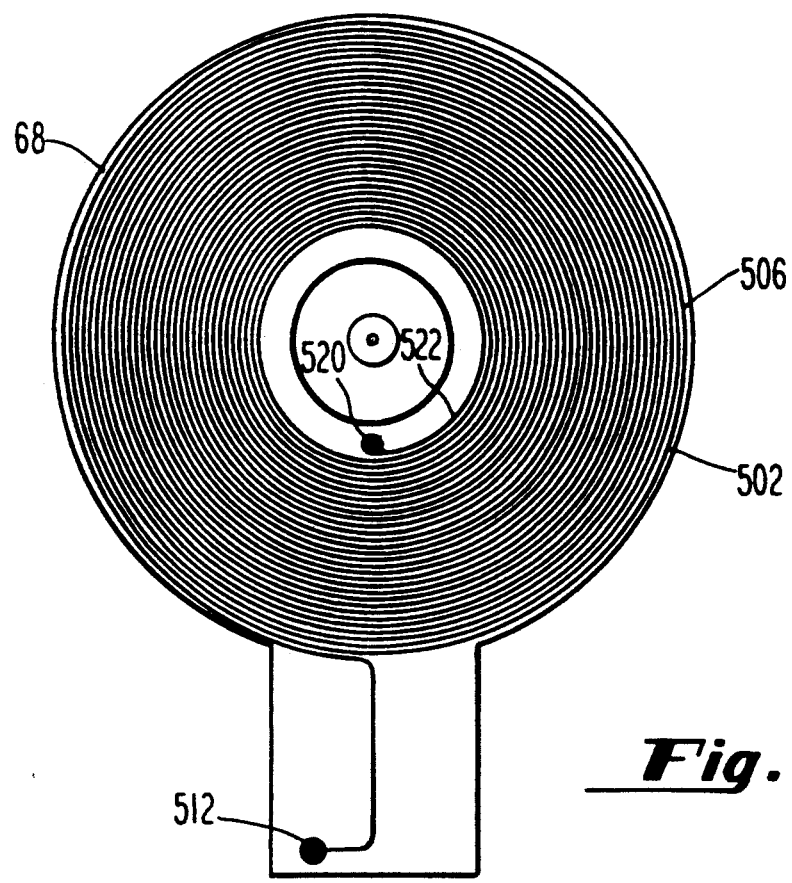

To complete the description of the rotor assembly 38, reference is now made to FIGS. 12 and 13 which illustrate the planar rotor exciter winding which is coupled or connected to the rotor resolver winding. The rotor exciter winding is comprised of a first portion 500 (See FIG. 12) and a second portion 502 (See FIG. 13). The first portion 500 of the rotor winding comprises a single printed circuit multi-turn coil 504 disposed on the third insulating layer 66 (FIG. 3) and the second portion 502 comprises a single printed circuit multi-turn coil 506 disposed on the fourth insulating layer 68 (FIG. 3). The rotor exciter winding form a continuous electrical path from the terminal 510 on layer 66 to the terminal 512 on layer 68. The printed circuit conductor 514 extends from terminal 510 and winds in a counterclockwise direction and ends on layer 66 at node 516. The first portion of the rotor exciter winding 500 is connected, through via hole 518 in the third layer 66 and node 520 on layer 56, in series with the second portion 502 of rotor exciter winding on fourth layer 68. The second portion 502 is wound in the same direction as the first portion 500 on the third layer 66 with the printed circuit conductor 522 winding in a counterclockwise direction and ending on layer 68 at terminal 512.

From the foregoing it will be understood that when the stator exciter winding has an AC source applied thereto an AC voltage will be induced in the rotor exciter winding and the rotor winding voltage will induce current in the rotor resolver winding, which, in turn, will induce a voltage in each of the first and second stator windings.

Figure 14:
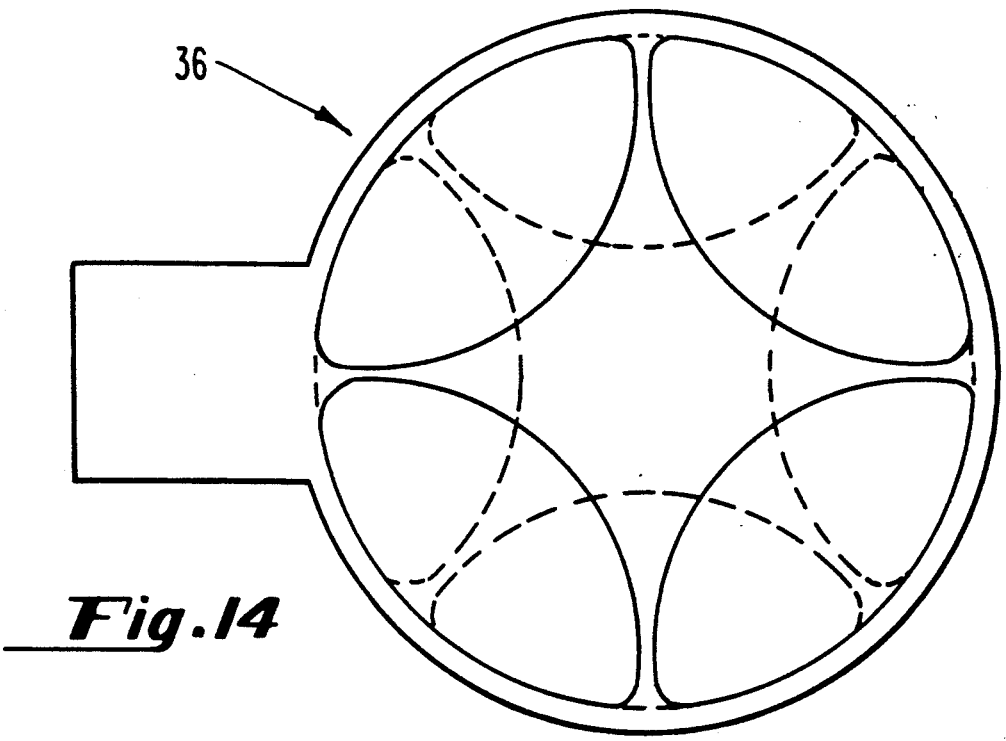
FIG. 14 depicts the relative positions of the stator windings of the stator assembly.

Referring now to FIG. 14, which depicts the relative positions of the stator windings of the stator assembly 36, it will be seen that the first stator winding formed on insulating layers 50 and 52 (shown in solid line) is mechanically spaced 45° relative to the second stator winding formed on insulating layers 58 and 60 (shown in dashed line). This 45° mechanical spacing results in a 90° electrical displacement as in the case of the resolver shown in FIG. 1. Therefore, the voltages appearing across the terminals 94, 96, on layers 50 and 52, respectively, and the voltages appearing across the terminals 214, 216, on layers 58 and 60, respectively, will vary according to a trigonometric function, e.g., sine and cosine, with an angular position of the rotor winding with respect to the stator windings. Inasmuch as the tangent of the angular position is merely the sine divided by the cosine, the sine and cosine values may be utilized to unambiguously determine angular position.

Figure 15:
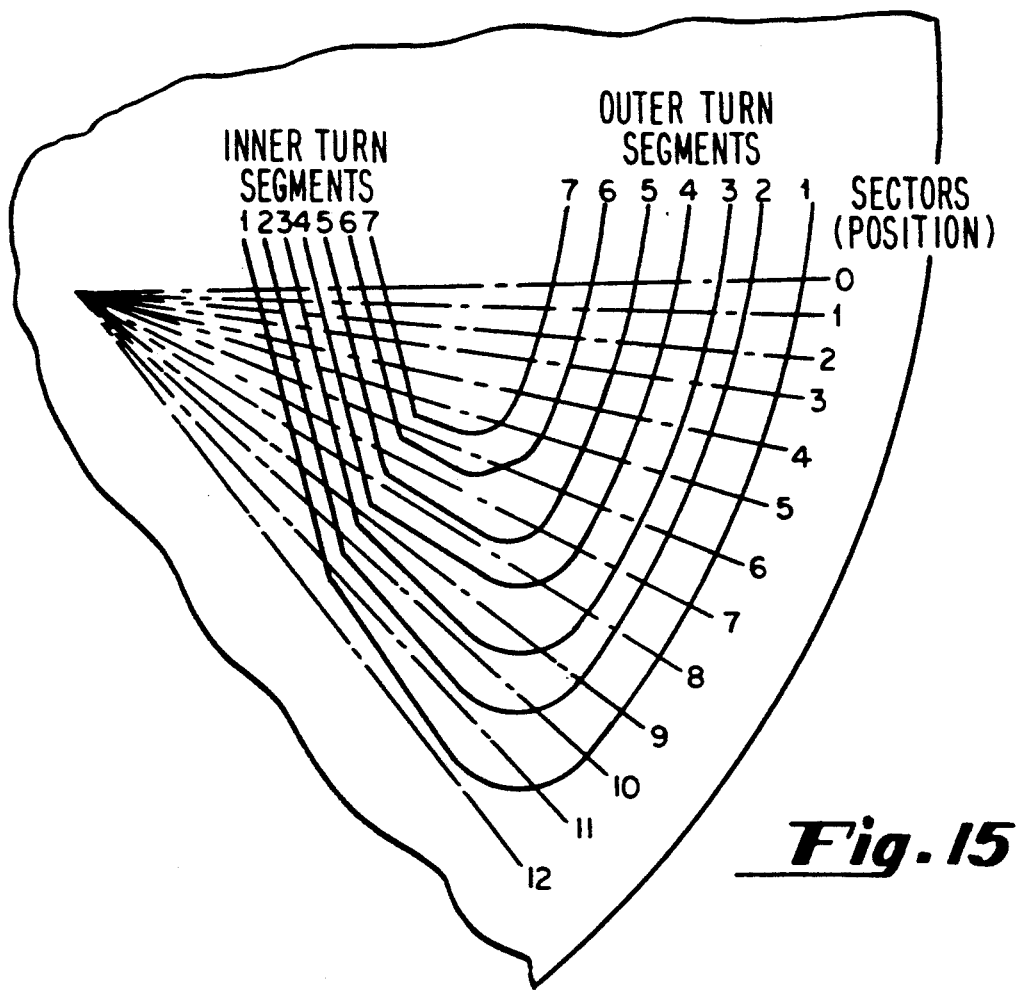
FIG. 15 is schematic diagram of one-half of a single multi-turn coil and is useful to explain the unique coil geometry in accordance with the invention.

Referring now to FIG. 15, the unique coil geometry according to the invention will be described. As described above each of the two stator windings (formed on disc-shaped insulating layers 50–52 and 58–60 respectively) and the rotor winding (formed on disc-shaped insulating layers 62–64) comprises a plurality of somewhat irregularly shaped, planar, coils having N turns per coil. As shown in FIG. 15, for example N=7, i.e. each coil is comprised of 7 turns. The location of each point on each turn of each coil may be defined in terms of its radial and circumferential position on the disc. The radial position of each point of each turn of each coil with respect to the center of the disc 600 is precisely determined. In addition, the circumferential position of each point on each turn of each coil is also precisely determined.

The radial position of each point of each turn of each coil is determined along a plurality of radially extending sector lines emanating from the center 600 of the disc. First, the coil is divided into 2M radial sectors, where M is the number of sectors intersecting one half of the coil. As shown in FIG. 15, M=12, i.e. one half of the depicted coil is intersected by 12 sector lines, the entire coil being intersected by a total of 24 sector lines. The distance from the center 600 of the disc along any given sector line to the closest point of any given turn (with respect to the center 600 of the disc) is defined as the inner turn radii R(inner). The distance from the center 600 of the disc along that same given sector line to the farthest point on the same turn (again with respect to the center 600 of the disc) is defined as the outer turn radii R(outer).

A value, V, is determined for each sector line. That value, V (sector n), is equal the sum of all outer turn radii along a given sector line minus the sum of all inner turn radii for the same given sector line. In other words:

$$V_{sector\ 12} = \Sigma\ R(outer)_{sector\ 12} - \Sigma\ R(inner)_{sector\ 12}$$
$$V_{sector\ 11} = \Sigma\ R(outer)_{sector\ 11} - \Sigma\ R(inner)_{sector\ 11}$$
$$V_{sector\ 10} = \Sigma\ R(outer)_{sector\ 10} - \Sigma\ R(inner)_{sector\ 10}$$
$$\vdots$$
$$V_{sector\ 0} = \Sigma\ R(outer)_{sector\ 0} - \Sigma\ R(inner)_{sector\ 0}$$

In order to produce a resolver with the desired sinusoidal and cosinusoidal outputs it has been found that the set of all of the calculated values, V, must define a sinusoidal function as a function of sector position, such that for example, V for sector 12 is a minimum and V for sector 0 is a maximum.

Although the invention has been shown and described with respect to preferred embodiments thereof it should be understood by those skilled in the art that various changes and omissions in the form and detail thereof may be made therein without departing from the spirit and scope of the invention.

Having thus described typical embodiments of my invention,

What is claimed is:

1. A resolver comprising:
   a stator assembly comprising a first planar stator winding and a second planar stator winding; and
   a rotor assembly disposed adjacent to said stator assembly and rotatable with respect to said stator assembly, said rotor assembly comprising a planar rotor winding for inductively coupling an energizing AC source when applied to said rotor winding to said first and second stator windings such that a voltage is induced in each of said first and second stator windings with each voltage varying according to a trigonometric function with the angular position of said rotor winding with respect to said first and second stator windings; wherein said stator assembly comprises:
   a first planar support member, a first portion of said first stator winding being disposed on said first support member;
   a second planar support member, said second support member positioned adjacent to said first support member and lying in a plane parallel to said first support member, a second portion of first stator winding being disposed on said second support member;
   a third planar support member, said third support member positioned adjacent to said second support member and lying in a plane parallel to said second support member, a first portion of second stator winding being disposed on said third support member; and
   a fourth planar support member, said fourth support member positioned adjacent to said third support member and lying in a plane parallel to said third support member, a second portion of said second stator winding being disposed on said fourth support member.

2. A resolver according to claim 1 wherein said stator assembly further comprises:
   a first planar plate of magnetic material positioned adjacent to said first and second stator windings, and
   wherein said rotor assembly further comprises:
   a second planar plate of magnetic material positioned adjacent to said rotor winding, said first and second plates providing paths of low magnetic reluctance.

3. A resolver according to claim 2 wherein said first stator winding and second stator winding are displaced mechanically 45° to each other and electrically 90° to each other.

4. A resolver according to claim 1 wherein said first portion of said first stator winding comprises:
   a first plurality of printed circuit multi-turn stator coils disposed in spaced apart relationship on said first support member; and
   wherein said second portion of said first stator winding comprises:
   a second plurality of printed circuit multi-turn stator coils disposed in a spaced apart relationship on said second support member.

5. A resolver according to claim 4 wherein said first plurality of stator coils are connected in series with said second plurality of stator coils.

6. A resolver according to claim 4 wherein said first portion of said second stator winding comprises:
   a third plurality of printed circuit multi-turn stator coils disposed in spaced apart relationship on said third support member; and
   wherein said second portion of said second stator winding comprises:
   a fourth plurality of printed circuit multi-turn stator coils disposed in spaced apart relationship on said fourth support member.

7. A resolver according to claim 6 wherein said third plurality of stator coils are connected in series with said fourth plurality of stator coils.

8. A resolver according to claim 1 wherein said rotor assembly comprises:
   a first planar support means, a first portion of said rotor winding being disposed on said first support means; and
   a second planar support means, said second support means positioned adjacent to said first support means and lying in a plane parallel to said first support means, a second portion of said rotor winding being disposed on said second support means.

9. A resolver according to claim 8 wherein said first portion of said rotor winding comprises:
   a first plurality of printed circuit multi-turn rotor coils disposed in spaced apart relationship on said first support means; and
   wherein said second portion of said rotor winding comprises;
   a second plurality of printed circuit multi-turn rotor coils disposed in spaced apart relationship on said second support means.

10. A resolver according to claim 9 wherein said first plurality of rotor coils are connected in series with said second plurality of rotor coils.

11. A resolver according to claim 1 further comprising means for exciting said rotor with an AC source.

12. A resolver according to claim 11 wherein said voltage induced in one of said first and second stator windings varies according to a sine function and said voltage induced in the other of said first and second stator windings varies according to a cosine function.

13. A resolver comprising:
a stator assembly comprising a first planar stator winding and a second planar stator winding; and
a rotor assembly disposed adjacent to said stator assembly and rotatable with respect to said stator assembly, said rotor assembly comprising a planar rotor winding for inductively coupling an energizing AC source when applied to said rotor winding to said first and second stator windings such that a voltage is induced in each of said first and second stator windings with each voltage varying according to a trigonometric function with the angular position of said rotor winding with respect to said first and second stator windings; wherein said stator assembly further comprises:
a planar stator excitor winding for inductively coupling an AC source to the rotor assembly, and wherein said rotor assembly further comprises:
a planar rotor excitor winding coupled to said rotor winding whereby when said stator excitor winding has an AC source applied thereto an AC voltage is induced in said rotor excitor winding and said rotor winding which AC voltage, in turn, induces said voltages in said first and second stator windings that vary according to a trigonometric function with the angular position of said rotor winding with respect to said stator windings.

14. A resolver according to claim 13 wherein said stator assembly further comprises:
a first planar support member, a first portion of said first stator winding being disposed on said first support member;
a second planar support member, said second support member positioned adjacent to said first support member and lying in a plane parallel to said first support member, a second portion of said first stator winding being disposed on said second support member;
a third planar support member, said third support member positioned adjacent to said second support member and lying in a plane parallel to said second support member, a first portion of said second stator winding being disposed on said third support member;
a fourth planar support member, said fourth support member positioned adjacent to said third support member and lying in a plane parallel to said third support member, a second portion of said second stator winding being disposed on said fourth support member;
a fifth planar support member, a first portion of said stator excitor winding being disposed on said fifth support member; and
a sixth planar support member, said sixth support member being positioned adjacent to said fifth support member and lying in a plane parallel to said fifth support member, a second portion of said stator excitor winding being disposed on said sixth support member; and wherein said rotor assembly further comprises:
a first planar support means, a first portion of said rotor winding being disposed on said first support means;
a second planar support means, said second support means positioned adjacent to said first support means and lying in a plane parallel to said first support means, a second portion of said rotor winding being disposed on said second support means;
a third planar support means, said third planar support member being positioned adjacent to said second support means, a first portion of said rotor excitor winding being disposed on said third support means; and
a fourth planar support means, said fourth support means positioned adjacent to said third support means and lying in a plane parallel to said third support means, a second portion of said rotor excitor winding being disposed on said fourth support means.

15. A resolver according to claim 14 wherein said first portion of said first stator winding comprises a first plurality of printed circuit multi-turn stator coils disposed in spaced apart relationship on said first support member, said second portion of said first stator winding comprises a second plurality of printed circuit multi-turn stator coils disposed in spaced apart relationship on said second support member, said first portion of said second stator winding comprises a third plurality of printed circuit multi-turn stator coils disposed in spaced apart relationship on said third support member, said second portion of said second stator winding comprises a fourth plurality of printed circuit multi-turn stator coils disposed in spaced apart relationship on said fourth support member, said first portion of said rotor winding comprises a first plurality of printed circuit multi-turn rotor coils disposed in spaced apart relationship on said first support means, said second portion of said rotor winding comprises a second plurality of printed circuit multi-turn rotor coils disposed in spaced apart relationship on said second support means, said first portion of said stator excitor winding comprises a single printed circuit multi-turn coil disposed on said fifth support member, said second portion of said stator excitor winding comprises a single printed circuit multi-turn coil disposed on said sixth support member, said first portion of said rotor excitor winding comprises a single printed circuit multi-turn coil disposed on said third support means, and said second portion of said rotor excitor winding comprises a single printed circuit multi-turn coil disposed on said fourth support means.

16. A resolver comprising:
a stator assembly comprising a first planar stator winding and a second planar stator winding; and
a rotor assembly disposed adjacent to said stator assembly and rotatable with respect to said stator assembly, said rotor assembly comprising a planar rotor winding for inductively coupling an energizing AC source when applied to said rotor winding to said first and second stator windings such that a voltage is induced in each of said first and second stator windings with each voltage varying according to a trigonometric function with the angular position of said rotor winding with respect to said first and second stator windings; wherein said first and second planar stator windings each comprise at least one planar multi-turn coil, said coil comprising N turns and 2M sectors, where N and M are numbers, said 2M sectors each being defined between two radial lines each of which radiate from a center point, each of said N turns having a plurality of inner turn radii and a plurality of outer turn radii, said inner turn radii for each turn being defined by the distances from said center point to the most proximate points on the turn, as measured along the sector lines, and said outer turn radii for each turn being defined by the distances from said center point to the most distant points on the turn, as measured along the same sector lines; the sum of all outer turn radii for a given sector line minus the sum of all inner turn radii for said given sector line defining a value; a set of all said values for all sector lines of said coil approximating a sinusoidal function.

17. A resolver according to claim 16 wherein said sinusoidal function is a maximum along the centermost sector line of said coil.

18. A planar winding according to claim 17 wherein the value for given turn and a given sector line is proportional to the flux contribution of said given turn along said sector line when said coil is carrying current.

* * * * *